US005614779A

United States Patent [19]

Zafferri

[11] Patent Number: 5,614,779

[45] Date of Patent: Mar. 25, 1997

[54] ELECTRONIC WATCH

[76] Inventor: Roberto Zafferri, Via alla Campagna 4, CH-6924 Sorengo, Switzerland

[21] Appl. No.: 372,582

[22] Filed: Jan. 13, 1995

[30] Foreign Application Priority Data

Jan. 26, 1994 [CH] Switzerland .............................. 237/94

[51] Int. Cl.[6] .............................. H02K 23/60; G04B 1/00

[52] U.S. Cl. .......................... 310/118; 310/36; 310/40 R; 310/83; 310/114; 322/1; 368/204

[58] Field of Search .............................. 310/36–38, 40 R, 310/66, 67 R, 74, 80, 83, 112, 114–116, 118, 156; 368/204; 322/1, 3, 4

[56] References Cited

U.S. PATENT DOCUMENTS

| | | | |
|---|---|---|---|
| 3,168,665 | 2/1965 | Holper | 310/118 X |
| 4,167,848 | 9/1979 | Kitai et al. | 310/114 X |
| 4,644,246 | 2/1987 | Knapen | 368/204 X |
| 5,278,806 | 1/1994 | Affolter | 368/204 |
| 5,534,737 | 7/1996 | Nishimura | 310/156 X |

FOREIGN PATENT DOCUMENTS

| | | |
|---|---|---|
| 0483065 | 4/1992 | European Pat. Off. . |
| 1058942 | 6/1959 | Germany . |
| 1811389 | 9/1959 | Germany . |
| 0671669 | 9/1989 | Switzerland . |
| WO9204662 | 3/1992 | WIPO . |

*Primary Examiner*—Mark O. Budd
*Attorney, Agent, or Firm*—Richard Linn

[57] ABSTRACT

The oscillating mass is integral with a toothed wheel which is engaged with pinions at the periphery of a plate. Many rotors at the periphery of the plate are located between sections of a peripheral, annular stator. The sections of the stator comprise cores and coils. It is thus possible with a simple construction of small thickness to obtain sufficient efficiency and power of the generator without considerable multiplication of the movement of the oscillating mass. The plate has a recess capable to receive a movement of an electronic watch of an existing caliber. The generator comprising the plate, the oscillating mass, the rotors and the stator constitutes an independent module capable to be assembled with a movement of an existing watch.

8 Claims, 2 Drawing Sheets

ELECTRONIC WATCH

BACKGROUND OF THE INVENTION

The present invention relates to an electronic watch comprising an oscillating mass coupled to the rotor of a generator by means of a gear train. Watches of this type are known, e.g. from CH-B-671 669 or from WO 92/04 662. The generators of these known watches comprise a unique rotor and stator which requires a considerable multiplication of the rotation of the oscillating mass in order to obtain an appropriate speed, respectively an efficiency and a power appropriate of the generator. Further, the generator requires enough place in the movement of the watch and anyhow, in any case, this requires a special movement comprising the oscillating mass, the gear train and the proper generator.

SUMMARY OF THE INVENTION

In order to avoid the above mentioned drawbacks the present invention proposes a watch characterized in that the oscillating mass is integral with a toothed wheel engaged with many pinions, each pinion being mounted on the axle of a magnetized rotor acting on a stator. The presence of many magnetized rotors permits to obtain sufficient efficiency and power by means of a relatively small multiplication with a unique toothed wheel engaged with the pinion of the rotors. A multiplication of 40 to 45 may suffice. Preferably, the magnetized rotors act on a common stator, e.g. an annular stator at the periphery of the movement. It is thus possible to realize a generator at the outside of the usual movement, and the generator which comprises the oscillating mass, the rotors and the stator can be realized in form of a module capable to be assembled with a standard watch movement. Therefore, the present invention relates also to a generator, which is characterized in that it constitutes a module capable to be assembled with a watch movement, and this generator can be further characterized by a plate which comprises a lodging for the movement of the watch. This permits to produce generators the lodging of which is able to receive watch movements of various calibers.

BRIEF DESCRIPTION OF THE DRAWINGS

The invention will be described further by way of an example of execution illustrated in the accompanying drawings in which.

DETAILED DESCRIPTION OF THE INVENTION

Figure 1:
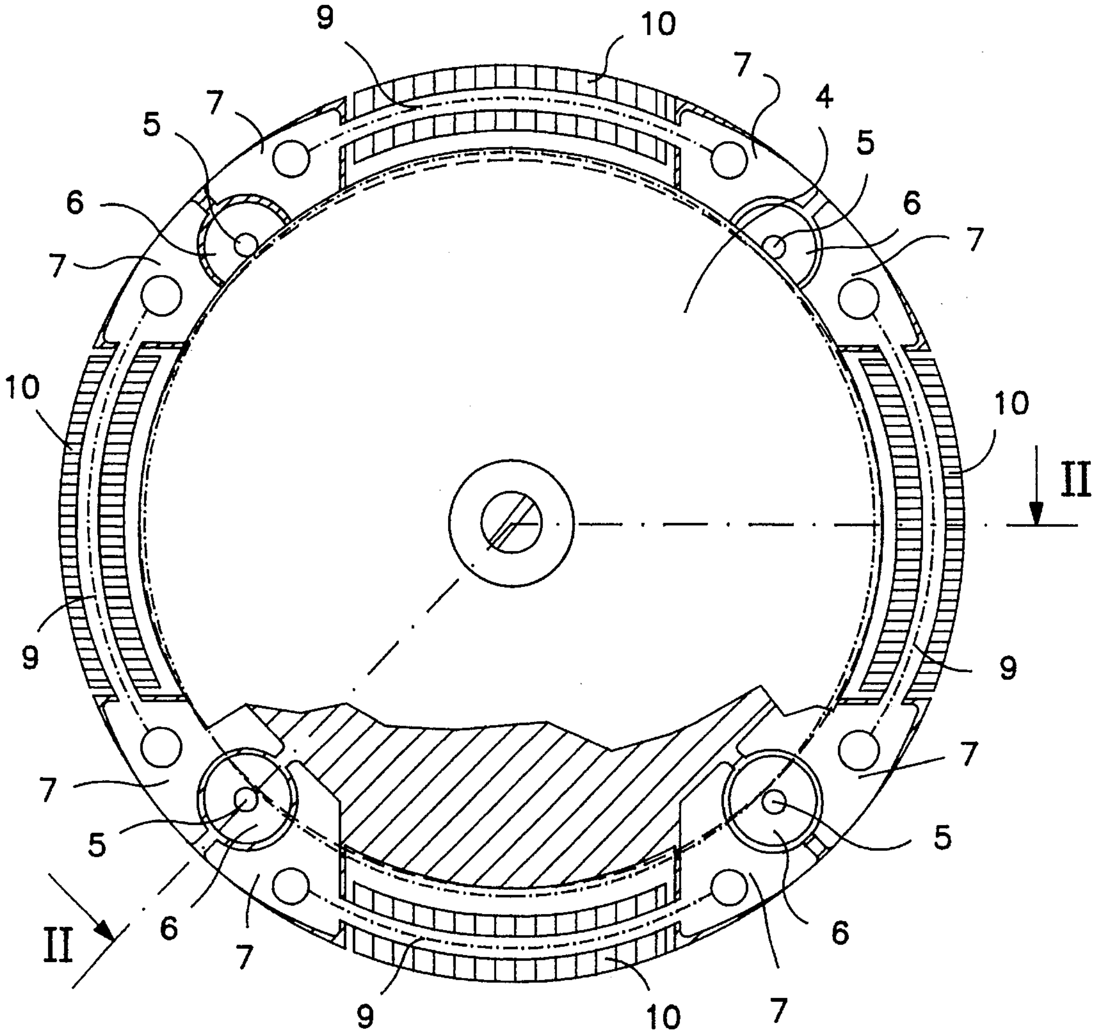
FIG. 1 is a top view without oscillating mass.
Figure 2:
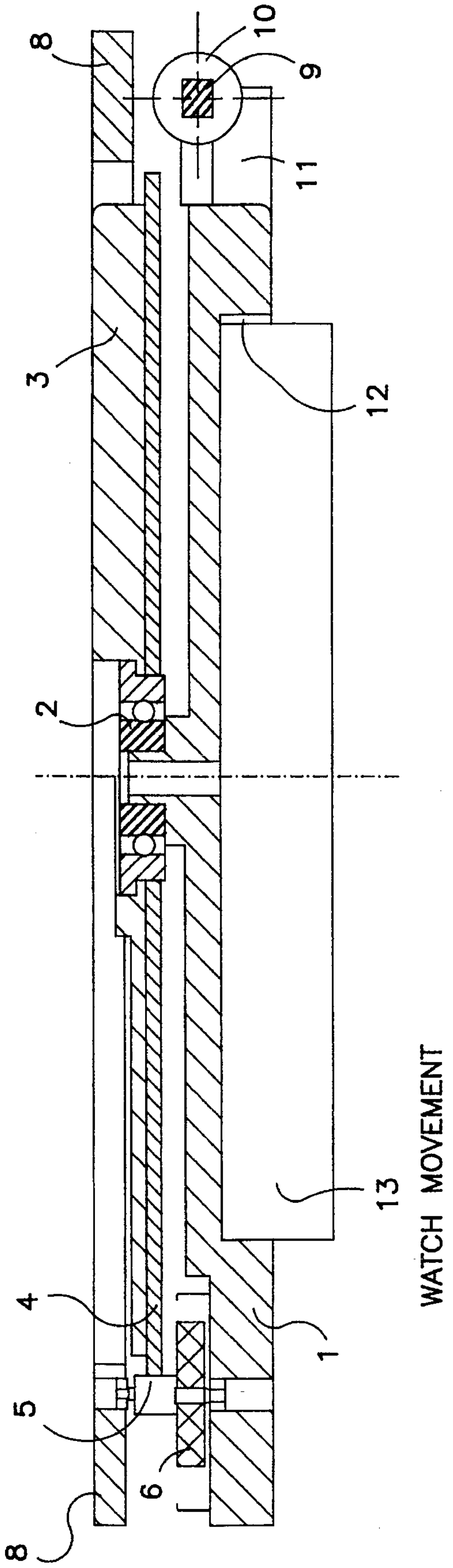
FIG. 2 is a section along the line II—II.

The generator part or generator module comprises a plate 1 on which an oscillating mass 3 is mounted by means of a ball bearing 2. This oscillating mass is integral with a toothed wheel 4 which is engaged with the pinions 5 of four magnetized rotors 6. This concerns bipolar rotors with diametral magnetization. The rotors with the pinions 5 are mounted on pivots in the plate 1 and a bridge 8. Each rotor

6 is located between two polar expansions 7 of a stator section 9 mounted on the plate 1. Each section 9 of the stator is provided with a coil 10. In fact there are the polar expansions which are fastened on projecting parts of the plate 1, while the sections 9 and coils 10 are located at the outside of the plate in cuttings 11 of the latter. The plate 1 has a lodging 12 adapted to receive a watch movement 13 of an appropriate caliber. The measures of the lodging 12 can be choosen for receiving a movement of an existing caliber of an electronic watch.

During each rotation of the oscillating mass 3, the four rotors 6 are driven synchroneously by the toothed wheel 4 and the pinions 5. The rotors 6 are arranged between the sections 7, 9 such that the magnetic flux adds up in the annular stator constituted by the four sections of the stator. In this way an intense flux variation and consequently a high efficiency and power of the generator is obtained in spite of the relatively small multiplication between the movement of the oscillating mass and the rotation of the rotors 6. The coils 10 can be connected in series or in parallel as a function of the degree of charge of the accumulator. The alternate current induced in the coils 10 can be rectified for charging the accumulator of the watch.

Instead of four rotors 6, more or less rotors, but in any case at least two rotors are provided. Whatever the number of rotors and of sections of the stator, the invention permits a simple construction with a small thickness of the watch because the polar expansions 7 are directly mounted on the plate and the sections 9 and coils 10 are mounted in cuttings of the plate.

I claim:

1. Electronic watch comprising an oscillating mass coupled to the rotor of a generator by means of a gear train, characterized in that the oscillating mass is integral with a toothed wheel engaged with many pinions, each pinion being mounted on the axle of a magnetized rotor acting on a stator.

2. Watch according to claim 1, characerized in that the magnetized rotors act on a common stator.

3. Watch according to claim 2, characterized in that the rotors are arranged in series between sections of the stator.

4. Watch according to claim 1, characterized in that the stator comprises many coils connected in series or in parallel.

5. Watch according to claim 2, characterized in that the stator comprises sections in a piece supporting a coil between polar expansions.

6. Generator in a watch according to claim 1, characterized in that it constitutes a module capable to be assembled with a watch movement.

7. Generator according to claim 6, characterized by a plate supporting the oscillating mass, the rotors and the stator and comprising a lodging for the watch movement.

8. Generator according to claim 7, characterized by an annular, peripheral stator.

* * * * *